US010947367B2

(12) United States Patent
Horn, III et al.

(10) Patent No.: US 10,947,367 B2
(45) Date of Patent: Mar. 16, 2021

(54) POLYTETRAFLUOROETHYLENE HEXAFERRITE COMPOSITES

(71) Applicant: ROGERS CORPORATION, Chandler, AZ (US)

(72) Inventors: Allen F. Horn, III, Pomfret Center, CT (US); Patricia A LaFrance, Pomfret Center, CT (US); Christopher J. Caisse, North Kingstown, RI (US); Karl Edward Sprentall, Medford, MA (US)

(73) Assignee: ROGERS CORPORATION, Chandler, AZ (US)

( * ) Notice: Subject to any disclaimer, the term of this patent is extended or adjusted under 35 U.S.C. 154(b) by 60 days.

(21) Appl. No.: 16/275,420

(22) Filed: Feb. 14, 2019

(65) Prior Publication Data

US 2019/0264005 A1 Aug. 29, 2019

Related U.S. Application Data

(60) Provisional application No. 62/634,296, filed on Feb. 23, 2018.

(51) Int. Cl.
| | |
|---|---|
| *C08K 9/06* | (2006.01) |
| *C08F 14/26* | (2006.01) |
| *C08K 3/22* | (2006.01) |
| *C08J 5/18* | (2006.01) |
| *H01F 1/34* | (2006.01) |
| *B29K 509/00* | (2006.01) |
| *H01F 41/02* | (2006.01) |
| *B29C 43/24* | (2006.01) |
| *B29C 43/00* | (2006.01) |
| *B29K 27/18* | (2006.01) |

(52) U.S. Cl.
CPC .............. *C08K 9/06* (2013.01); *C08F 14/26* (2013.01); *C08J 5/18* (2013.01); *C08K 3/22* (2013.01); *H01F 1/34* (2013.01); *H01F 1/348* (2013.01); *B29C 43/003* (2013.01); *B29C 43/24* (2013.01); *B29K 2027/18* (2013.01); *B29K 2509/00* (2013.01); *C08J 2327/18* (2013.01); *C08K 2003/2289* (2013.01); *C08K 2201/005* (2013.01); *C08K 2201/01* (2013.01); *H01F 41/02* (2013.01)

(58) Field of Classification Search
None
See application file for complete search history.

(56) References Cited

U.S. PATENT DOCUMENTS

| | | |
|---|---|---|
| 4,518,787 A | 5/1985 | Treadgold |
| 5,223,568 A | 6/1993 | Landi et al. |
| 5,506,049 A | 4/1996 | Swei et al. |
| 7,976,720 B2 | 7/2011 | Sakamoto |
| 8,641,918 B2 | 2/2014 | Hussain et al. |
| 10,468,169 B2 | 11/2019 | Chen et al. |
| 2004/0054029 A1 | 3/2004 | Fujiki et al. |
| 2009/0101873 A1 | 4/2009 | Tan et al. |
| 2009/0266604 A1 | 10/2009 | Tetsuji |
| 2009/0297432 A1 | 12/2009 | Hill |
| 2010/0052992 A1 | 3/2010 | Okamura et al. |
| 2010/0068512 A1 | 3/2010 | Imaoka et al. |
| 2010/0231433 A1 | 9/2010 | Tishin et al. |
| 2012/0038532 A1 | 2/2012 | Yonetsu et al. |
| 2012/0049100 A1 | 3/2012 | Yonetsu et al. |
| 2012/0249375 A1 | 10/2012 | Heino et al. |
| 2013/0140076 A1 | 6/2013 | Lee et al. |
| 2013/0342414 A1 | 12/2013 | Hong et al. |
| 2016/0099498 A1 | 4/2016 | Pance et al. |
| 2016/0113113 A1 | 4/2016 | Sethumadhavan et al. |
| 2019/0013128 A1 | 1/2019 | Chen et al. |

FOREIGN PATENT DOCUMENTS

| | | | |
|---|---|---|---|
| CN | 103304186 A | 9/2013 | |
| CN | 104193224 A | 12/2014 | |
| WO | 2012103020 A2 | 8/2012 | |
| WO | 2016149465 A1 | 9/2016 | |
| WO | WO-2016149465 A1 * | 9/2016 | ............... H01F 1/37 |
| WO | 2017127388 A1 | 7/2017 | |

OTHER PUBLICATIONS

Hansen et al., "Antennas with Magneto-Dielectrics", Microwave and Optical Technology Letters, vol. 26, No. 2, Jul. 2000, pp. 75-78.
International Search Report for Internation Application No. PCT/US2019/17920, International Filing Date Feb. 14, 2019, dated Jun. 13, 2019, 11 Pages.
Jaejin Lee et al: "Role of Small Permeability in Gigahertz Ferrite Antenna Performance", IEEE Magnetics Letters, col. 2, Jan. 1, 2013, pp. 5000104-5000104, XP055241013, USA.
Jing et al., "Magnetic and Dielectric Properties of Barium Ferrite Fibers/poly(vinylidene fluoride) Composite Films," Journal of Polymer Research, Kluwer Academic Publishers-Consultants Bureau, NL, Apr. 20, 2011, pp. 2017-2021, vol. 18, No. 6.
Martin et al.; "Flexible Magnetic Composites"; Passive RF Component Technoloby, Materials Techniques and Applications; Chapter 8; 2012; pp. 156-185.
Pullar, "Hexagonal Ferrite Fibres and Nanofibres," Trans Tech Publications, 2016, pp. 1-68, vol. 241.
Sharma et al.; "Ultra Low Loss Soft Magnetic Nanoparticles for Applications Up to S-band," Applied Physics Letters, vol. 103, 112402, Sep. 2013.
Written Opinion for International Application No. PCT/US2019/17920, International Filing Date Feb. 14, 2019, dated Jun. 13, 2019, 11 Pages.

* cited by examiner

*Primary Examiner* — Chinessa T. Golden
(74) *Attorney, Agent, or Firm* — Cantor Colburn LLP

(57) ABSTRACT

Disclosed herein is a hexaferrite composite comprising polytetrafluoroethylene; and greater than or equal to 40 vol %, or 40 to 90 vol % a plurality of $Co_2Z$ hexaferrite particles based on the total volume of the polytetrafluoroethylene and the plurality of $Co_2Z$ hexaferrite particles on a void-free basis; wherein the hexaferrite composite has a porosity of greater than or equal to 10 vol % based on the total volume of the hexaferrite composite; wherein the hexaferrite composite has a permeability of greater than or equal to 2.5 and a ratio of the permeability to the permittivity of greater than or equal to 0.4, both determined at 500 MHz.

20 Claims, No Drawings

POLYTETRAFLUOROETHYLENE HEXAFERRITE COMPOSITES

CROSS-REFERENCE TO RELATED APPLICATION

This application claims the benefit of U.S. Provisional Patent Application Ser. No. 62/634,296 filed Feb. 23, 2018, which is incorporated herein in its entirety by reference.

BACKGROUND

Magneto-dielectric materials, materials with a relative permeability and a relative permittivity greater than one, have been of great interest to antenna designers since the early days of AM radio. The primary interest in these materials has been driven by the need for antenna miniaturization. A resonant antenna's size is a function of the wavelength of an electromagnetic wave at its resonant frequency. In free space (a vacuum), the wavelength, λ, of an electromagnetic wave is defined by the speed of light, c, divided by the frequency, f, of the wave as shown in Equation [1].

$$\lambda = c/f \quad [1]$$

When an electromagnetic wave propagates through an insulating medium having a relative permittivity, $\varepsilon_r$, (also referred to herein merely as the permittivity) and/or a relative permeability, $\mu_r$, (also referred to herein as merely the permeability) of greater than one, the propagation speed is reduced, and the wavelength is calculated as a function of the speed of propagation in the material as shown in Equation [2].

$$\lambda = c/f\sqrt{(\varepsilon_r \mu_r)} \quad [2]$$

In Equation [2], $\sqrt{(\varepsilon_r \mu_r)}$ [3] is the reduction in the speed of propagation of the wave through the medium. This term can also be referred to as the miniaturization factor. The medium also has an intrinsic impedance, which is the ratio of the electric field to magnetic flux density for a transverse-electric-magnetic wave propagating through the medium. The intrinsic impedance, Z, of the medium can be calculated from the ratio of relative permeability to relative permittivity multiplied by the intrinsic impedance of free space, $$\sqrt{\left(\frac{\mu_0}{\varepsilon_0}\right)}, \quad [4]$$

as shown in Equation [5].

$$Z = \sqrt{\left(\frac{\mu_0}{\varepsilon_0}\right)\left(\frac{\mu_r}{\varepsilon_r}\right)} \quad [5]$$

From the basics of wave propagation, it is known that when a travelling wave encounters an impedance discontinuity, reflection occurs. However, from evaluating Equation [4] and Equation [5] it becomes apparent that if $\mu_r = \varepsilon_r$, then Equation [6] arises.

$$\sqrt{\left(\frac{\mu_0}{\varepsilon_0}\right)\left(\frac{\mu_r}{\varepsilon_r}\right)} = \sqrt{\left(\frac{\mu_0}{\varepsilon_0}\right)} \quad [6]$$

Thus, it becomes apparent that while both a high relative permittivity and high relative permeability can be used to create a material that exhibits a high miniaturization factor, a material with an equal relative permittivity and relative permeability will allow for a large miniaturization factor while also maintaining an intrinsic impedance equal to that of free space. The proposed benefit of this match of intrinsic impedance for an antenna design is improved efficiency and improved bandwidth. The exact relationship between permeability, permittivity, and antenna bandwidth is a function of the antenna design. However, a widely cited relationship is that of Equation [7] that is derived by Hansen and Burke in 2000 (Hansen, R. C., and Mary Burke. "Antennas with magneto-dielectrics." Microwave and Optical Technology Letters 26.2 (2000): 75-78). Hansen and Burke derive an important conclusion: "It is important to note that unlike ε, μ does not reduce the patch bandwidth. Such a substrate has an important advantage: the patch resonant length is reduced by √μ so that a much shorter (and smaller) patch will have the same bandwidth as a patch with ε only". In Equation [7], $\lambda_o$ denotes the free space wavelength and t is equal to fractional bandwidth at a 2:1 Voltage to Standing Wave Ratio (VSWR).

$$\frac{96\sqrt{\left(\left(\frac{\mu_r}{\varepsilon_r}\right)\right)} t/\lambda_o}{\sqrt{2}\left[4 + 17\sqrt{(\mu_r \varepsilon_r)}\right]} \quad [7]$$

Magnetically permeable materials for incorporation into polymeric matrices can be broken down into two fundamental categories: ferromagnetic metals and iron oxide ceramics, known as "ferrites". Within these classes of materials, several selection criteria are known to those skilled in the art. Magnetic materials are subject to frequency dependent electromagnetic properties, primarily a frequency dependence of real and imaginary permeability. It is known to those skilled in the art that ferromagnetic and ferrimagnetic materials are subject to a limitation first described by Snoek, known as Snoek's law as shown in Equation [8]. Snoek's law states that the product of initial permeability, μ'−1, and ferromagnetic resonance frequency (defined as the peak of imaginary permeability), $F_o$, is a constant value equal to two thirds the gyromagnetic ratio, γ4π, times the magnetic saturation, $M_S$. A general rule is to achieve a low magnetic loss tangent, the ferromagnetic resonant frequency must be substantially higher than the maximum operating frequency. Typically, "substantially higher" is understood to mean that ferromagnetic resonance must be three to five times higher than the maximum desired operating frequency.

$$(\mu'-1)*F_o = \tfrac{2}{3}\gamma 4\pi M_S \quad [8]$$

From evaluation of Snoek's law, it becomes clear that to achieve a high maximum operating frequency, it is desirable to start with a material with a high $4\pi M_S$ value. The $4\pi M_S$ values of some known magnetic materials are listed in Table A.

TABLE A

| Material | $4\pi M_S$ (Gauss) |
| --- | --- |
| Co$_2$Z Hexaferrite | 4,000 |
| NiZn Ferrite | 6,000 |
| Permendur (Iron Cobalt) | 24,000 |
| Sendust (Iron Silicon) | 20,100 |

TABLE A-continued

| Material | $4\pi M_S$ (Gauss) |
|---|---|
| Iron Rich Permalloy (45/55) | 16,000 |
| NiMoFe (Super Permalloy) | 8,000 |
| Iron Oxide ($Fe_3O_4$) | 4,500 |
| NiFe (Permalloy) 80/20 | 7,500 |
| mu Metal (Ni, Fe, Cu, Cr) | 8,000 |
| Iron | 20,000 |
| Cobalt | 18,000 |
| Nickel | 6,200 |

From this, it was assumed by those of skill in the art that the use of ferromagnetic metals such as Iron, Iron Nickel Alloy, Iron Silicon Alloy, or Iron Cobalt Alloy would have been advantageous in achieving a high permeability at a high frequency. When incorporated into a polymer matrix to form a composite, it was found that these materials, though exhibiting a high permeability to a high frequency, were deficient in at least three areas as shown in Table B, where the magnetic fillers were added in the respective volume percent in the hydrocarbon thermosetting resin system as described in U.S. Pat. No. 5,223,568. First, Table B shows that the relative permittivity at 500 megahertz (MHz) of composites containing ferromagnetic metals is substantially higher than that of composites containing metal oxides. Second, the dielectric loss tangent at 500 MHz is too high for practical use. Third and finally, the magnetic loss tangent at 500 MHz is high relative to the ferromagnetic resonance frequency.

TABLE B

| Material | $4\pi M_S$ (Gauss) | Volume Percent | Relative Permeability | Relative Permittivity | Magnetic Loss Tangent | Dielectric Loss Tangent |
|---|---|---|---|---|---|---|
| $Co_2Z$ Hexaferrite (Trans Tech TTZ500) | 4,000 | 60 | 2.5 | 6 | 0.05 | 0.003 |
| NiZn Ferrite (Trans Tech TT2 111R) | 5,000 | 40 | 3.1 | 5 | 0.36 | 0.03 |
| LiNiZn Ferrite (Trans Tech Ferrite 50) | 3700 | 40 | 3.6 | 12 | 0.38 | 0.24 |
| Iron Oxide ($Fe_3O_4$) | 4,500 | 40 | 1.6 | 17 | 0.027 | 0.44 |
| NiFe (Permalloy) 80/20 | 7,500 | 30 | 3.0 | 32 | 0.042 | 0.36 |
| Iron | 20,000 | 60 | 7.0 | 22 | 0.13 | 0.04 |
| Cobalt | 18,000 | 40 | 2.1 | 8 | 0.072 | 0.012 |

Spinel ferrites are the most commonly manufactured "soft" magnetic oxides. Within the class of soft spinel ferrites, two primary families of materials are used, Manganese Zinc Ferrite (MnZn Ferrite) and Nickel Zinc Ferrite, (NiZn Ferrite). Manganese Zinc ferrite is typically used in power applications, such as the inductor and transformer cores. It has a relative permeability of 500 and 15,000, with a cut-off frequency of 1 to 10 MHz. Due to its low cut-off frequency, it is not a viable candidate for use in very high frequency (VHF) or ultra-high frequency (UHF) magneto-dielectrics. Nickel Zinc ferrite is typically used in power inductor and transformer cores, and microwave transformer cores. It typically has a relative permeability of 20 to 3,500, and a cut-off frequency of less than 300 MHz. Due to its low cut-off frequency, it is not a viable candidate for UHF magneto-dielectric materials. Magnetite, $Fe_3O_4$ was the first magnetic oxide discovered, and is a naturally occurring material. It typically exhibits a low cut-off frequency and low resistivity, limiting its applicability to low loss magneto-dielectric materials.

Hexagonal ferrite materials, "hexaferrites" are a class of ferrimagnetic materials first made in the 1950s by Phillips Corporation. They exhibit magneto-crystalline anisotropy (and an "internal anisotropy field"), with each phase of hexagonal ferrite having an internal anisotropy field that in large part defines their magnetic characteristics. Typically, it is understood that the relative permeability of a hexagonal ferrite is inversely proportional to the anisotropy field, but that the cut-off frequency is proportional to the anisotropy field.

There are three phases of hexaferrite that have been commercially produced and are available for use in magneto-dielectric composites, M, Y, and Z. Y and Z phase hexaferrites are often referred to by their phase and transition metal. For example, Cobalt Z-phase hexaferrite is commonly referred to as $Co_2Z$ hexaferrite, or more properly as $Co_2Z$ ferrite. M-phase hexaferrite has the basic formula $BaFe_{12}O_{19}$. The M-Phase of hexaferrite is most commonly manufactured hexaferrite, typically exhibits a high coercivity, and is generally classified as a hard magnetic material that does not exhibit a substantial real relative permeability. It is typically referred to as BaM, Barium Hexaferrite, or SrM, Strontium Hexaferrite. It is known as one of the lowest cost magnetic materials to manufacture, and it finds use in low energy permanent magnets and microwave absorbers. Pure M phase hexaferrite has a ferromagnetic resonance frequency of 45 to 50 gigahertz (GHz), but a relative permeability close to one. Based on its low real permeability, it is not a viable option to produce low loss magneto-dielectrics.

Y-phase hexaferrite has the basic chemical formula $Ba_2Me_2Fe_{12}O_{22}$ with Me being a transition metal, typically Cobalt, Magnesium, or Zinc. Relative to other available hexaferrites, Y phase hexaferrites typically exhibit a lower saturation magnetization than $Co_2Z$ or BaM hexaferrites, a lower anisotropy field than M Phase hexaferrites, and a higher anisotropy field than Z phase hexaferrites. Ideal $Co_2Y$ hexaferrite should have a ferromagnetic resonance of around 5.7 GHz, with an approximate relative permeability of four. Practically demonstrated $Co_2Y$ ferrites exhibit a relative permeability of around 3, with a ferromagnetic resonance frequency of around 3 GHz. Y-ferrites detailed in research literature exhibit relative permittivity between ten and twenty-five. The permittivity to permeability ratio of greater than three, makes them unsuitable candidates for high impedance magneto-dielectric composites.

Z-phase hexaferrite has the basic formula $Ba_3Me_2Fe_{24}O_{41}$ with Me being a transition metal, typically Cobalt, Zinc, or Titanium. Relative to other available hexaferrites, Z-phase hexaferrites typically exhibit a lower saturation magnetization than M-phase hexaferrites, but higher than Y-phase, with a lower internal anisotropy field than both materials. The formation of a pure Z-phase of hexaferrite is understood to be extremely difficult, so materials referred to as Z-phase hexaferrites often contain small amounts of secondary phases, typically M, Y, or W. Ideal $Co_2Z$ hexaferrite has a cut-off frequency of approximately 3.4 GHz, and a relative permeability of approximately nine, but in practice the cut-off frequency is dramatically lower, around 1 GHz. Z-type ferrites typically have relative permittivity values in the range of 7 to 20, making them a more viable candidate for high impedance magneto-dielectric materials. However, substitutions, which can be utilized to increase the relative permeability of Z-type hexaferrites typically also increase the relative permittivity of the material, and the ratio of permeability to permittivity in hexaferrite materials is generally no greater than 1.1. While Z-phase hexaferrites are a candidate for high impedance magneto-dielectric composites, the limitation of approximately equal permeability and permittivity must be overcome to achieve an impedance approximately equal to free space.

Chinese Patent 104193224B discloses a substrate comprising 45 to 55 weight percent (wt %) $Co_2Z$ ferrite in polytetrafluoroethylene (PTFE). On a void-free basis, these values are equivalent to 25 volume percent (vol %) and 33 vol %, respectively. The $Co_2Z$ ferrite powder in this patent has an average particle size of 1 micrometer that is blended with PTFE powder and ethanol. The wet mixture is then dried and the PTFE-ferrite composite mixture is molded at a pressure of 10 MPa and a maximum temperature of 360 degrees Celsius (° C.). This molding procedure resulted in a substrate having a relative permeability of 2.8 to 3.8 and a relative permittivity of 6.5 to 8.0. However, the composite fails to achieve good values for the ratio of the relative permeability to the relative permittivity.

Chinese Patent 103304186B discloses a substrate comprising 85 to 90 wt % $Co_2Z$ ferrite in polyimide, where the substrate of the '186 patent had a relative permeability of 2.5 to 4.5 and a relative permittivity of 7.0 to 9.0.

U.S. Pat. No. 7,976,720 B2 discloses a magnetic sheet comprising 83 to 98 wt % of Fe—Si in a PTFE binder, and a dry powder mixing process that eliminates solvent in order to decrease porosity in an attempt to increase the permeability.

U.S. Pat. No. 8,641,918 B2 discloses a substrate comprising reduced carbonyl iron flakes with an aspect ratio greater than 10 that exhibits negative permeability at ferromagnetic resonance. The 'addition of graphite or other conductive materials to increase their permittivity and also discloses that their substrates have a very high loss of $\varepsilon''/\varepsilon'$ of 0.3 to 1.0 and $\mu''/\mu'$ of 0.1 to 1.0 at 500 MHz as estimated from FIGS. 1 and 2, and FIGS. 3 and 4. The relative permeability to relative permittivity ratio is also very low. For example, comparing the values in FIGS. 1 and 3 at 500 MHz shows a maximum permeability to relative permittivity ratio of about 0.04. The relative permeability to relative permittivity ratio for the substrates measured in FIGS. 5 and 6 is only about 0.01.

All of the substrates of the above-identified patents were observed to obtain a ratio of the relative permeability to the relative permittivity of less than 0.6. A magneto-dielectric material having one or more of an increased relative permeability and an increased ratio of the relative permeability the relative permittivity is therefore desired.

BRIEF SUMMARY

Disclosed herein is a hexaferrite composite comprising PTFE; and greater than or equal to 40 vol %, or 40 to 90 vol % a plurality of $Co_2Z$ hexaferrite particles based on the total volume of the PTFE, and the plurality of $Co_2Z$ hexaferrite particles on a void-free basis; wherein the hexaferrite composite has a porosity of greater than or equal to 10 vol % based on the total volume of the hexaferrite composite; wherein the hexaferrite composite has a permeability of greater than or equal to 2.5 and a ratio of the permeability to the permittivity of greater than or equal to 0.4, both determined at 500 MHz.

Further disclosed is an article can comprise the hexaferrite composite.

Also disclosed is a method of forming a sheet comprising the hexaferrite composite comprising paste extruding, casting, or molding a mixture comprising the PTFE and the plurality of $Co_2Z$ hexaferrite particles to form the sheet.

The above described and other features are exemplified by the following detailed description and claims.

DETAILED DESCRIPTION

It was surprisingly discovered that a porous hexaferrite composite comprising polytetrafluoroethylene (PTFE) and greater than or equal to 40 vol % of a plurality of $Co_2Z$ hexaferrite particles based on the total volume of the polytetrafluoroethylene and the plurality of $Co_2Z$ hexaferrite particles on a void-free basis could achieve one or both of a permeability of greater than or equal to 2.5 and an increased ratio of the permeability to the permittivity of greater than or equal to 0.4, both determined at 500 MHz. By tuning one or more of the particle size of the $Co_2Z$ hexaferrite particles, the relative amount of the $Co_2Z$ hexaferrite particles, or the porosity of the hexaferrite composite, both the permeability and the ratio of the permeability to the permittivity can be further increased. For example, the present hexaferrite composites can achieve one or both of permeabilities of 4.5 to 7, or 6 to 7 and a ratio of the permeability to the permittivity of 0.5 to 0.98, or 0.7 to 0.98.

The hexaferrite composite comprises PTFE. The PTFE can comprise at least one of a homopolymer or a trace modified homopolymer. As used herein, a trace modified PTFE homopolymer comprises less than 1 wt % of a repeat unit derived from a co-monomer other than tetrafluoroethylene based on the total weight of the PTFE. The PTFE can be polymerized by emulsion polymerization to form a dispersion that can be further coagulated to form a coagulated dispersion or fine powder PTFE. A sheet can be formed from the coagulated dispersion for fine powder via paste extrusion and calendaring. Alternatively, the PTFE can be polymerized by suspension polymerization to form a granular PTFE. A hexaferrite composite comprising a coagulated dispersion or fine powder PTFE formed by paste extrusion and calendering can be less brittle as compared to a substrate of the same composition but comprising a granular PTFE.

The hexaferrite composite can comprise less than or equal to 60 vol %, or 5 to 60 vol %, or 10 to 50 vol %, or 10 to 40 vol % of the PTFE based on the total volume of the PTFE and the plurality of $Co_2Z$ hexaferrite particles on a void-free basis.

The hexaferrite composite comprises a plurality of $Co_2Z$ hexaferrite particles. The $Co_2Z$ hexaferrite particles can comprise one or more divalent cations in addition to the Cobalt. For example, the one or more other divalent cations can comprise at least one of Al, Ba, Bi, Ni, Ir, Mn, Mg, Mo, Nb, Nd, Sr, V, Zn, or Zr. Specifically, the one or more other divalent cations can comprise at least one of Sr, Ba, Ni, Zn, V, or Mn. In an embodiment, the $Co_2Z$ hexaferrite particles can have the formula $Ba_3CO_2Fe_{24}O_{41}$.

The shape of the $Co_2Z$ hexaferrite particles can be irregular or regular, for example, spherical, ovoid, flakes, and the like. The $Co_2Z$ hexaferrite particles can comprise one or both of magnetic nano-particles and micrometer sized particles. The $Co_2Z$ hexaferrite particles can have a median particle size of greater than or equal to 4 micrometers, or 10 to 100 micrometers, or 12 to 30 micrometers as measured using Horiba LA-910 laser light scattering PSD analyzer or as determined in accordance with ASTM D4464-15. It was surprisingly discovered that merely by increasing the particle size, for example, to a median particle size of greater than or equal to 10 micrometers that the hexaferrite composite could have one or both of increased permeability values and an increased matching of the permeability to the permittivity to values of 0.7 to almost 1 (0.97) at 500 MHz. The plurality of $Co_2Z$ hexaferrite particles can have a multimodal particle size distribution, for example, comprising a first plurality of particles having a median particle size of less than or equal to 1 micrometer and a second plurality of particles having a median particle size of greater than or equal to 5 micrometers.

The hexaferrite composite can comprise 40 to 95 vol %, or 50 to 95 vol %, or 60 to 90 vol % of the plurality of $Co_2Z$ hexaferrite particles based on the total volume of the polytetrafluoroethylene and the plurality of $Co_2Z$ hexaferrite particles on a void-free basis. It was surprisingly discovered that increasing the volume percentage of the $Co_2Z$ hexaferrite particles, for example, to an amount of 60 to 95 vol % was able to produce hexaferrite composites with increased permeability values of 4.6 to 6.5 and having a ratio of the permeability to the permittivity of 0.7 to almost 1 (0.97) at 500 MHz.

The $Co_2Z$ hexaferrite particles can be surface-treated (also referred to herein as coated) to aid dispersion into the PTFE, for example, with at least one of a surfactant (such as oleylamine oleic acid), an inorganic material (such as $SiO_2$, $Al_2O_3$, and MgO), a silane, a titanate, or a zirconate.

The coating can comprise at least one of a silane coating, a titanate coating, or a zirconate coating. The coating can comprise at least one of phenyltrimethoxysilane, p-chloromethylphenyltrimethoxy silane, aminoethylaminotrimethoxy silane, aminoethylaminopropyltrimethoxy silane, phenyltriethoxysilane, 3,3,3-trifluoropropyl trimethoxysilane, (tridecafluoro-1,1,2,2-tetrahydrodecyl)-1-triethoxysilane, neopentyl(diallyl)oxytrineodecanoyl titanate, neopentyl(diallyl) oxytri(dioctyl)phosphate titanate, neopentyl(diallyl)oxytri(dioctyl)pyrophosphate zirconate, or neopentyl(diallyl) oxytri(N-ethylenediamino)ethyl zirconate. The coating can comprise a silane coating comprising at least one of an aromatic silane such as phenyltrimethoxysilane or a fluorinated aliphatic alkoxy silane such as (tridecafluoro-1,1,2,2-tetrahydrooctyl)triethoxy silane.

The $Co_2Z$ hexaferrite particles can be pretreated with the coating agent prior to forming the composite mixture, or the coating agent can be added to the composite mixture prior to forming the composite. The coating can be present in an amount of 0.2 to 4 wt %, or 1 to 3 wt % based on the total weight of the $Co_2Z$ hexaferrite particles.

The hexaferrite composite can have a porosity of greater than or equal to 10 vol %, or 15 to 50 vol %, or 20 to 45 vol % based on the total volume of the composite. The porosity can be determined via a density calculation or via xylene uptake measurements. The presence of a fraction of porosity was found to improve the ratio of the permeability to the permittivity. Without intending to be bound by theory, it is believed that substituting a volume of the PTFE with air lowers the permittivity of the overall composite due to the lower permittivity of air of 1.0 as compared to the permittivity of PTFE of 2.1. However, since both air and PTFE are not magnetic and have a permeability of 1.0, the composite permeability value is unchanged by the presence of the porosity, resulting in an improvement in the permeability to permittivity ratio of closer to 1. The pores or void space can be open, such that air can flow from one surface of the hexaferrite composite to the opposite surface of the hexaferrite composite through the pores of the composite.

The hexaferrite composite (also referred to herein as the composite) can have a permeability of greater than or equal to 2.5, or greater than 2.5, or 4.5 to 7, or 6 to 7 at 500 MHz. The composite can have a permittivity of greater than or equal to 4, or 5 to 8, or 6 to 7 at 500 MHz. The composite can have a ratio of the permeability to the permittivity of greater than or equal to 0.4, or 0.5 to 0.98, or 0.7 to 0.98 at 500 MHz. The composite can have a magnetic loss tangent of less than or equal to 0.1, or less than or equal to 0.08, or 0.01 to 0.07, or 0.01 to 0.05 at 500 MHz. The composite can have a dielectric loss of less than or equal to 0.1, or less than or equal to 0.05, or 0.001 to 0.05, or 0.01 to 0.05 at 500 MHz. The magneto-dielectric properties can be measured using a coaxial airline with a Nicolson-Ross extraction from the scattering parameters measured using a vector network analyzer.

The hexaferrite composite can have copper bond strength of 3 to 7 pli (pounds per linear inch) (0.54 to 1.25 kilograms per centimeter (kg/cm)), or 4 to 6 pli (0.71 to 1.07 kg/cm), as measured in accordance with IPC test method 650, 2.4.9.

The hexaferrite composite can comprise a dielectric filler. The dielectric filler can comprise at least one of silica (for example, fused amorphous silica), wollastonite, solid glass spheres, synthetic glass or ceramic hollow spheres, quartz, boron nitride, aluminum nitride, silicon carbide, alumina trihydrate, magnesia, mica, talc, nanoclay, or magnesium hydroxide. The dielectric filler can be present in an amount of 1 to 60 vol %, or 10 to 50 vol % based on the total volume of the hexaferrite composite on a void-free basis.

The composite can comprise a reinforcement layer such as a fibrous layer. The fibrous layer can be woven or non-woven, such as a felt. The fibrous layer can comprise non-magnetic fibers (for example, glass fibers and polymer-based fibers), magnetic fibers (for example, metal fibers and polymer-based magnetic fibers), or a combination comprising one or both of the foregoing. Such a thermally stable fiber reinforcement reduces shrinkage of the composite upon cure within the plane of the substrate. In addition, the use of the cloth reinforcement can help render a substrate with a relatively high mechanical strength. Such substrates can be processed by, for example, coating or lamination, including roll-to-roll lamination. The fibrous layer can have magnetic particles dispersed therein.

The glass fibers can comprise at least one of E glass fibers, S glass fibers, or D glass fibers. The polymer-based fibers can comprise high temperature polymer fibers. The polymer-based fibers can comprise a liquid crystal polymer such as VECTRAN commercially available from Kuraray America Inc., Fort Mill, S.C. The polymer-based fibers can comprise at least one of polyetherimide, polyether ketone, polysulfone, polyethersulfones, polycarbonate, or polyester. A relatively small amount of glass, such as 20 vol % or less of the total hexaferrite composite on a void free basis is preferred as such amounts can help to preserve the higher ratio of permeability to permittivity.

The hexaferrite composite can be prepared by forming a sheet and calendering the sheet to form the hexaferrite composite. The sheet can be formed by paste extruding a lubricated crumb comprising PTFE, a lubricant, and the hexaferrite particles. Examples of lubricants include ISOPAR™ commercially available from Exxon Chemical Company, Houston, Tex. The lubricant can comprise glycol ethers such as dipropylene glycol. The mixing can comprise mixing in a tumble mixer that rotates 360° in the vertical direction. The lubricated crumb can be formed by mixing the PTFE, the hexaferrite, and the lubricant. The mixing can comprise first mixing the PTFE, then adding the hexaferrite, and lastly mixing in the lubricant. The mixing can comprise assisted mixing, for example, with a stir bar optionally having one or more mixing blades. A commercially available example of a mixer having a stir bar is a Patterson Kelly Vee-Blender with an intensifier bar. The mixing can comprise first mixing the PTFE and the $Co_2Z$ hexaferrite in an air mill. A commercially available example of an air mill is the Jet Pulverizer Micron-Master mill. The air milled powder can allow for higher filler loadings without the article becoming brittle. The mixing can occur for 4 to 100 minutes, or 10 to 50 minutes.

The lubricated crumb can be heated prior to forming the sheet, for example, at a temperature of 40 to 150° C. for 1 to 40 hours. The sheet can be formed by paste extrusion. The paste extrusion can occur at a temperature of 15 to 150° C., or 40 to 60° C. The sheet can be formed by compression molding.

The sheet can be calendered. The calendering can comprise a single calendering step or multiple calendering steps. For example, the sheet can be subjected to an initial calendering step, wherein the sheet is passed through at least one set of opposing stainless steel calendering rolls, which have an adjustable gap thickness there between. The gap thickness between the rolls can be adjusted to decrease the thickness of the sheet as it passes between them. During the calendering, the width of the sheet will be maintained, but the length of the sheet increases as the thickness decreases. One example of a commercially available calendering machine is the small Killion two-roll stack (Killion Extruders, Inc., Cedar Grove, N.J., 07009). The sheet can then be further calendered in one or more calendering steps, for example, at an angle of 45 to 135°, for example, 90° of the initial calendering direction. The calender rolls can be heated, for example, to a temperature of 40 to 150° C., or 45 to 60° C.

After calendering, the hexaferrite composite can be soaked in water, for example, for 10 to 60 minutes, or 15 to 20 minutes to remove any solvent and heated at a temperature of 150 to 300° C., or 50 to 300° C., or 200 to 300° C. for 1 to 40 hours, or 5 to 15 hours. After heating, the sheet can comprise less than or equal to 0.2 wt %, or 0 to 0.1 wt % of the lubricant based on the total weight of the sheet.

A sheet comprising the hexaferrite composite can be formed by casting. For example, the casting can comprise casting an aqueous dispersion comprising the PTFE, the $Co_2Z$ hexaferrite particles, a liquid carrier, and an optional viscosity modifier onto a carrier sheet; drying the cast dispersion; sintering to form the sheet; and removing from the carrier sheet. The liquid carrier can comprise water. The optional viscosity modifier can comprise at least one of polyacrylic acid, methyl cellulose, polyethylene oxide, guar gum, locust bean gum, sodium carboxymethylcellulose, sodium alginate, or gum tragacanth. The casting can comprise casting onto a glass fabric. The method can comprise multiple casting steps to result in an increased thickness of the sheet. After the casting, the cast dispersion can be heated to a first temperature to dry form a dried sheet, for example, at a temperature of 150 to 300° C. The dried sheet can then be sintered, for example, at a sintering temperature of 350 to 400° C. The casting can be performed in accordance with U.S. Pat. No. 5,506,049.

A sheet comprising the hexaferrite composite can be formed by molding. For example, the molding can comprise mixing a molding mixture comprising a granular PTFE and the $Co_2Z$ hexaferrite particles (for example, by air milling), molding the mixture, and optionally calendaring. The mixing can comprise intensively mixing the molding mixture in order to achieve a uniform molded part with good physical properties. For example, the mixing the molding mixture can comprise mixing by powder blending and an additional high intensity mixing step. The high intensity mixing can include passing the mixture through an air mill, such as the Micron-Master air mill, made by the Jet Pulveriser Company of Moorestown, N.J., the SpeedMixer bladeless mixer made by FlackTek of Landrum, S.C., or dry blending in a Vee Blender with an intensifier bar. After intensive mixing, the molding mixture can be compression molded or dry calendered.

The hexaferrite composite can have a conductive layer disposed thereon. Useful conductive layers include, for example, at least one of stainless steel, copper, gold, silver, aluminum, zinc, tin, lead, transition metals, or an alloy comprising at least one of the foregoing. There are no particular limitations regarding the thickness of the conductive layer, nor are there any limitations as to the shape, size, or texture of the surface of the conductive layer. The conductive layer can have a thickness of 3 to 200 micrometers, or 9 to 180 micrometers. When two or more conductive layers are present, the thickness of the two layers can be the same or different. The conductive layer can comprise a copper layer. Suitable conductive layers include a thin layer of a conductive metal such as a copper foil presently used in the formation of circuits, for example, electrodeposited copper foils.

The conductive layer can be applied by laminating the conductive layer onto the hexaferrite composite, by direct laser structuring, or by adhering the conductive layer to the hexaferrite composite via an adhesive layer. Other methods known in the art can be used to apply the conductive layer where permitted by the particular materials and form of the circuit material, for example, electrodeposition, chemical vapor deposition, and the like.

The laminating can entail laminating a multilayer stack comprising the hexaferrite composite, a conductive layer, and an optional intermediate layer between the hexaferrite composite and the conductive layer to form a layered structure. The conductive layer can be in direct physical contact with the hexaferrite layer, without the intermediate layer. The layered structure can then be placed in a press, e.g., a vacuum press, under a pressure and temperature and for a duration of time suitable to bond the layers and form a laminate Lamination and optional curing can be by a one-step process, for example, using a vacuum press, or can be by a multi-step process. In a one-step process, the layered structure can be placed in a press, brought up to laminating pressure (e.g., 150 to 400 pounds per square inch (psi) (1 to 2.8 megapascal) and heated to laminating temperature (e.g., 350 to 390 degrees Celsius (° C.)). The laminating temperature and pressure can be maintained for a desired soak time, i.e., 20 minutes, and thereafter cooled (while still under pressure) to less than or equal to 150° C.

The intermediate layer can comprise a polyfluorocarbon film located in between the conductive layer and the hexaferrite composite. The polyfluorocarbon film comprises a fluoropolymer (such as polytetrafluoroethylene (PTFE), a fluorinated ethylene-propylene copolymer (such as Teflon FEP), and a copolymer having a tetrafluoroethylene backbone with a fully fluorinated alkoxy side chain (such as Teflon PFA)).

The conductive layer can be applied by laser direct structuring. Here, the hexaferrite composite can comprise a laser direct structuring additive; and the laser direct structuring can comprise using a laser to irradiate the surface of the hexaferrite composite, forming a track of the laser direct structuring additive, and applying a conductive metal to the track. The laser direct structuring additive can comprise a metal oxide particle (such as titanium oxide or copper chromium oxide). The laser direct structuring additive can comprise a spinel-based inorganic metal oxide particle, such as spinel copper. The metal oxide particle can be coated, for example, with a composition comprising tin and antimony (for example, 50 to 99 wt % of tin and 1 to 50 wt % of antimony, based on the total weight of the coating). The laser direct structuring additive can comprise 2 to 20 parts of the additive based on 100 parts by weight of the respective composition. The irradiating can be performed with a YAG laser having a wavelength of 1,064 nanometers under an output power of 10 Watts, a frequency of 80 kilohertz (kHz), and a rate of 3 meters per second. The conductive metal can be applied using a plating process in an electroless plating bath comprising, for example, copper.

The conductive layer can be applied by adhesively applying the conductive layer. The conductive layer can be a circuit (the metallized layer of another circuit), for example, a flex circuit. An adhesion layer can be disposed between one or more conductive layers and the hexaferrite composite.

The following examples are provided to illustrate present disclosure. The examples are merely illustrative and are not intended to limit devices made in accordance with the disclosure to the materials, conditions, or process parameters set forth therein.

EXAMPLES

In the examples, the materials listed in Table 1 were used.

The $Co_2Z$-4 hexaferrite had a median particle size as measured by the Horiba LA-910 laser light scattering PSD analyzer of 4 micrometers, a specific surface are of 2 to 3 meters squared per gram ($m^2/g$) determined by gas absorption surface analysis, a particle density as measured by helium pycnometry of 5.4 grams per cubic centimeter ($g/cm^3$) and, according to the manufacturer's data, a permeability of 10 and a magnetic Q factor of greater than 15 at 500 megahertz (MHz).

The $Co_2Z$-15 hexaferrite had a median particle size as measured by the Horiba LA-910 laser light scattering PSD analyzer of 15 micrometers, a specific surface area of about 0.3 $g/m^2$ determined by gas absorption surface analysis, a particle density as measured by helium pycnometry of 4.5 $g/cm^3$, and, according to the manufacturer's data, a permeability of 15 up to 300 MHz and a magnetic Q factor of 5 at 500 MHz.

The $Co_2Z$-15R hexaferrite was prepared in house in accordance with the preparation of the $Co_2Z$-15 hexaferrite of Spectrum Magnetics, LLC. The two hexaferrites had the same properties as outlined above.

The $Co_2Z$-25R hexaferrite was prepared in house in accordance with the preparation of the $Co_2Z$-15 hexaferrite of Spectrum Magnetics, LLC. The two hexaferrites had the same properties as outlined above except that particle size was 25 to 28 micrometers.

TABLE 1

| | | |
|---|---|---|
| $Co_2Z$-4 hexaferrite | TTZ-500 $Co_2Z$ hexaferrite powder having a median particle size of 4 micrometers | Trans-Tech division of Skyworks |
| $Co_2Z$-15 hexaferrite | SMMDF-101 $Co_2Z$ hexaferrite powder having a median particle size of 15 micrometers | Spectrum Magnetics, LLC |
| $Co_2Z$-15R hexaferrite | $Co_2Z$ hexaferrite powder having a median particle size of 15 micrometers | Rogers Corporation |
| $Co_2Z$-25R hexaferrite | $Co_2Z$ hexaferrite powder having a median particle size of 25 to 28 micrometers | Rogers Corporation |
| Aromatic alkoxysilane | DC-6124 phenyl-trimethoxy silane | Dow Corning Corporation |
| Fluorinated aliphatic alkoxysilane | (tridecafluoro-1,1,2,2-tetrahydrooctyl)triethoxy silane | Gelest, Inc. |
| PTFE | Dyneon™ TF-2029 | 3M |

Before incorporating the hexaferrite powders into the PTFE, the powders were pretreated with a 3:1 by weight mixture of an aromatic alkoxysilane and fluorinated aliphatic alkoxysilane. In various experiments, a silane was applied at levels ranging from 0.5 to 9 wt % based on the total weight of hexaferrite powder.

A typical organosilane treatment method is as follows: for a 2 wt % blend, 446 grams of isopropyl alcohol (IPA) was placed in a 1 liter beaker on a magnetic stirrer; and 223 grams of aromatic alkoxysilane, 73 grams of the fluorinated aliphatic alkoxysilane, 22.3 grams of water, and 0.22 grams of 1 Normal HCl were added to the IPA and allowed to mix for 1 hour to form a treatment mixture. 14,500 grams of the hexaferrite powder was placed in a 16-quart Patterson Kelly Vee-Blender with a liquid addition intensified bar. The blender was sealed, and the shell allowed to rotate for 2 minutes to mix the powder. The treatment mixture was then added through the intensifier bar over a period of 8 minutes. The blender was stopped, and the electric cord was unplugged from the wall socket for safety. The blender was opened, and the walls were scraped with plastic spatula. The blender was again sealed and rotated with the intensifier bar running for an additional ten minutes. The treated powder was emptied into a large oven tray and cured for 8 hours at 135° C. and an additional 3 hours at 260° C. and allowed to cool to form the treated hexaferrite.

The following exemplary procedure was followed to prepare composites comprising 60 vol % of hexaferrite and 40 vol % of PTFE via paste extrusion and calendering. 7,200 grams of the treated hexaferrite powder was placed in a 16-quart Patterson Kelly Vee-Blender with liquid addition intensified bar. 1,945.2 grams of PTFE was also placed in the blender. The blender was tumbled without the intensifier bar for several minutes to blend the dry powder. 1,366.6 grams of dipropyleneglycol (DPG) was added through the liquid addition intensifier bar over a period of ten minutes. The blender was stopped, the electric plug removed from the wall socket for safety, and the walls were scraped with the plastic spatula. The blender was sealed and run for an additional two minutes with the intensifier bar and then just tumbled for another 4 minutes. The blended lubricated crumb was placed in a sealed plastic drum and stored in an oven at 50° C. for 24 hours prior to paste extrusion and calendering.

The paste extrusion step was performed using a Jennings International laboratory extruder. A 1.5-inch (3.81 cm) wide tape was formed in a simple tapered die that enacted a smooth transition from the 1.5-inch (3.81 cm) diameter barrel to a 1.5-inch (3.81 cm) wide by 0.100-inch (2.54 mm) slot. Both the barrel and die were traced with heating tape and held at a temperature of 50° C. The resulting 1.5-inch (3.81 cm) wide tape was cut into 15-inch (38.1 cm) lengths to be fed sideways to a 16-inch (40.64 cm) wide by 12-inch (30.48 cm) diameter two roll Kobelco Stewart Bolling, Inc. calender. The calender rolls were heated to 50° C. with heated water. The ribbon was calendered into 15.5-inch (39.37 cm)×22-inch (55.88 cm) sheets. The sheets were soaked in warm water for 20 minutes to remove the DPG lubricant and were then dried in an oven for 6 hours at 260° C.

The dried sheets were trimmed to 14 inches (35.56 cm)×19 inches (48.26 cm) and weighed. The sheets were laminated between polished caul plates to Circuit foils HFZ copper foil at a pressure on the laminate of 400 psi (2.57 MPa), with a 90-minute dwell time of 700° F. (371° C.). The final density for each formulation (including the porosity) was known from prior experimentation, so one can choose the component sheets of a complete laminate according to the basis weight.

Table 2 shows the weight percent and void-free densities for the hexaferrite composites assuming a ferrite density of 5.4 g/cm³ and a PTFE density of 2.18 g/cm³.

TABLE 2

| Hexaferrite (vol %) | 40 | 50 | 60 | 70 | 80 |
|---|---|---|---|---|---|
| Hexaferrite (wt %) | 62.3 | 71.2 | 78.8 | 85.3 | 90.8 |
| Void-free density (g/cm³) | 3.47 | 3.79 | 4.11 | 4.43 | 4.75 |

In the examples, the permeability, permittivity, and corresponding magnetic and dielectric loss tangent values were measured from 45 MHz to 3 GHz in a Damaskos 1 inch (25 mm) coaxial airline. An annular ring of the material to be tested was machined precisely to fit tightly in the airline. After calibration, the s-parameters of the empty airline were measured over the frequency range of interest. The sample was then inserted in the airline and the s-parameters of the sample containing airline were recorded. The permeability, permittivity, and magnetic and dielectric loss tangent values were extracted using the Nicolson-Ross method.

The theoretical void free density of the composite, $\rho_{comp,\,theo}$, was calculated from the density and volume fractions of the components as $$\rho_{comp,theo} = \Sigma v_i \rho_i$$

where $\rho_i$ is the density of component i and $v_i$ is the volume fraction of component i. The theoretical void free density of the composite, $\rho_{comp}$, can also be calculated from the density and weight fractions of the components as $\rho_{comp,theo} = (\Sigma w_i / \rho_i)^{-1}$, where $w_i$ is the weight fraction of component i. The void fraction, $v_f$, was calculated from the actual measured density of the composite, $\rho_{comp}$, as $v_f = 1 - \rho_{comp}/\rho_{comp,theo}$, and the percent porosity by density is therefore $100 \times v_f$.

The percent porosity was also determined by xylene uptake as xylene has a relatively low surface tension. The composite sample was weighted and immersed in xylene for 48 hours and reweighed. The volume of xylene absorbed was calculated from the weight gain. This method is accurate as long as the porosity is "accessible" and not sealed off or encapsulated.

Examples 1-8: Effect of Increasing Amount of Hexaferrite Composites

The hexaferrite composites of Examples 1-8 were prepared by the paste extrusion and calendering process described above using a surface treated $Co_2Z$-15R hexaferrite. The resultant properties of the composites of Examples 1-8 are shown in Table 3, where the dielectric and magnetic properties were determined at 500 MHz.

TABLE 3

| Example | 1 | 2 | 3 | 4 | 5 | 6 | 7 | 8 |
|---|---|---|---|---|---|---|---|---|
| Hexaferrite (vol %) | 60 | 60 | 65 | 70 | 75 | 75 | 80 | 80 |
| Permittivity | 5.8 | 5.6 | 5.7 | 5.4 | 5.8 | 5.2 | 5.3 | 5.3 |
| Permeability | 4.6 | 4.5 | 4.6 | 4.5 | 4.7 | 4.5 | 4.6 | 4.7 |
| Permeability/Permittivity | 0.79 | 0.79 | 0.81 | 0.84 | 0.82 | 0.87 | 0.87 | 0.88 |
| Dielectric loss tangent | 0.01 | 0.01 | 0.01 | 0.01 | 0.01 | 0.01 | 0.01 | 0.01 |
| Magnetic loss tangent | 0.06 | 0.07 | 0.07 | 0.07 | 0.07 | 0.06 | 0.06 | 0.06 |
| Theoretical density (g/cm³) | 4.11 | 4.11 | 4.27 | 4.43 | 4.60 | 4.60 | 4.75 | 4.75 |
| Actual density (g/cm³) | 3.20 | 3.14 | 3.13 | 2.86 | 3.06 | 3.02 | 2.86 | 2.89 |
| Porosity (%) by density | 22 | 24 | 27 | 35 | 33 | 34 | 40 | 39 |
| Porosity (%) by xylene uptake | 21 | 23 | 25 | 31 | 31 | 37 | 39 | 38 |

The hexaferrite composites described in the '224 patent serve as comparative examples. The '224 patent discloses substrate materials comprising a maximum of 33 vol % of $Co_2Z$ ferrite with a median particle size of less than 1 micrometer. The '224 patent exhibits a maximum permeability value of 3.8 and a maximum permeability to permittivity ratio of 0.475. Presumably due in part to the higher volume filler loadings achieved in Examples 1-8 and the larger median particle size, the present composite achieves significantly higher permeability values than the substrate material of the '224 patent. The substrate material of the '224 patent also achieves a maximum permeability to permittivity ratio of only 0.475, while the permeability to permittivity ratios of Examples 1-8 range from 0.79 to 0.88. The improved ratio of Examples 1-8 likely arises from the increased porosity of 22 to 39 vol % of the present composites as compared to the substrate material of the '224 patent.

Examples 9-13: Effect of Increasing Particle Size of the Hexaferrite

Examples 9-13 were prepared in accordance with Examples 1-8 except that a surface treated $Co_2Z$-25R hexaferrite was used in Examples 9-12 and a reduced size, surface treated $Co_2Z$-25R hexaferrite was used in Example 13. The hexaferrite powders were organosilane treated with a 2 wt % of the coating mixture. The composites comprised 60 vol % hexaferrite. The results are shown in Table 4, where NM stands for not measured.

TABLE 4

| | Example | | | | |
|---|---|---|---|---|---|
| | 9 | 10 | 11 | 12 | 13 |
| Permittivity | 6.6 | 6.6 | 7.1 | 6.9 | 6.7 |
| Permeability | 6.4 | 6.3 | 6.5 | 6.3 | 4.8 |
| Permeability/Permittivity | 0.97 | 0.95 | 0.92 | 0.92 | 0.71 |
| Dielectric loss tangent | 0.007 | 0.003 | 0.010 | 0.007 | 0.007 |
| Magnetic loss tangent | 0.06 | 0.06 | 0.07 | 0.08 | 0.06 |
| Theoretical density (g/cm$^3$) | 4.11 | 4.11 | 4.11 | 4.11 | 4.11 |
| Actual density (g/cm$^3$) | NM | 3.45 | 3.50 | 3.43 | 3.51 |
| Porosity (%) by density | NM | 16 | 15 | 17 | 15 |

Comparing Table 3 and Table 4, it can be seen that the larger median particle size hexaferrites of Examples 9 to 12 resulted in an increase in the permeability from 4.5 and 4.6 in Examples 1 and 2, to 6.3 to 6.5 in Examples 9 to 12. The ratio of permeability to permittivity also increased from 0.79 in Examples 1 and 2 to 0.92 to 0.97 in Examples 9-12.

In order to show that it was indeed primarily the increase in median particle size that was the cause of the increase in the permeability and the improvement of the permeability/permittivity ratio, a sample of the $Co_2Z$-25R hexaferrite was ground up such that the resultant ground hexaferrite had a median particle of 15 micrometers using a Vortec Turbo impact mill. The ground sample was surface treated and made into a 60 vol % hexaferrite composite of Example 13. The reduction in the median particle size resulted in a reduction in the permeability to 4.8 and reduction in the ratio of the permeability to the permittivity to 0.71. Both values are nearly identical those of Examples 1 and 2, made with the $Co_2Z$-15R hexaferrite.

Examples 14-21: Effect of Decreasing Particle Size of the Hexaferrite

Examples 14-21 were prepared from the $Co_2Z$-4 hexaferrite that was treated with 2 wt % of the coating mixture. The hexaferrite composites were prepared by paste extrusion and calendering as described in Example 1 and were laminated in a flatbed press at 400 psi (2.8 megapascal). The results of coaxial airline testing for permittivity and permeability as well as the density and porosity measurements are shown in Table 5.

TABLE 5

| Example | 14 | 15 | 16 | 17 | 18 | 19 | 20 | 21 |
|---|---|---|---|---|---|---|---|---|
| Hexaferrite (vol %) | 60 | 60 | 65 | 65 | 70 | 70 | 80 | 80 |
| Permittivity | 5.79 | 5.48 | 5.36 | 5.16 | 5.24 | 4.98 | 5.01 | 4.85 |
| Permeability | 2.53 | 2.48 | 2.47 | 2.56 | 2.52 | 2.46 | 2.56 | 2.47 |
| Permeability/Permittivity | 0.44 | 0.45 | 0.46 | 0.50 | 0.48 | 0.49 | 0.51 | 0.51 |
| Dielectric loss tangent | 0.03 | 0.04 | 0.02 | 0.01 | 0.01 | 0.01 | 0.02 | 0.01 |
| Magnetic loss tangent | 0.05 | 0.06 | 0.04 | 0.06 | 0.04 | 0.03 | 0.03 | 0.03 |
| Theoretical density (g/cm$^3$) | 4.11 | 4.11 | 4.27 | 4.27 | 4.43 | 4.43 | 4.75 | 4.75 |
| Actual density (g/cm$^3$) | 3.13 | 3.06 | 3.05 | 2.94 | 2.93 | 2.83 | 2.79 | 2.86 |
| Porosity (%) by density | 24 | 26 | 29 | 31 | 34 | 36 | 41 | 40 |
| Porosity (%) by xylene uptake | 22 | 25 | 27 | 32 | 34 | 35 | 41 | 39 |

Table 5 shows that the permeability values and the permeability to permittivity ratios of Examples 14-21 are reduced as compared to the hexaferrite composites comprising the larger sized hexaferrite particles.

It is noted that the permeability to permittivity ratios of many of Examples 14-21 are higher than those described in the '224 patent. For example, at the highest loading of 80 vol % (Example 20), the permeability to permittivity ratio is 0.51.

Examples 22-23: Effect of Lamination Pressure

Examples 22 and 23 were prepared as described in Example 14 except that they were laminated in a flatbed press at 1,200 psi (8.3 MPa). The results of coaxial airline testing for permittivity and permeability as well as the density and porosity measurements are shown in Table 6, where Example 14 and Example 18 are reproduced for ease of reference.

TABLE 6

| | Example | | | |
|---|---|---|---|---|
| | 14 | 18 | 22 | 23 |
| Hexaferrite (vol %) | 60 | 70 | 60 | 70 |
| Lamination pressure (psi) | 400 | 400 | 1,200 | 1,200 |
| Permittivity | 5.79 | 5.24 | 6.61 | 5.76 |
| Permeability | 2.53 | 2.52 | 3.34 | 3.32 |
| Permeability/Permittivity | 0.44 | 0.48 | 0.51 | 0.58 |
| Dielectric loss tangent | 0.03 | 0.01 | 0.06 | 0.01 |
| Magnetic loss tangent | 0.05 | 0.04 | 0.05 | 0.03 |
| Theoretical density (g/cm$^3$) | 4.11 | 4.43 | 4.11 | 4.43 |
| Actual density (g/cm$^3$) | 3.13 | 2.93 | 3.31 | 3.22 |
| Porosity (%) by density | 24 | 34 | 19 | 27 |
| Porosity (%) by xylene uptake | 22 | 34 | 16 | 21 |

Table 6 shows that merely by increasing the lamination pressure, the permeability and the permeability to permittivity ratio can be increased, while still maintaining a porosity.

Example 24: Peel Testing of Copper Clad Laminates of the Hexaferrite Composite

Four composites comprising 60 vol % $Co_2Z$-15R hexaferrite treated with 2 wt % of the coating mixture were prepared in the 16-quart Patterson Kelly Vee-Blender and paste extruded and calendered to form approximate 15-inch (38.1 cm)×22-inch (55.88 cm) sheets. The sheets were trimmed and stacked to an expected final thickness of 0.100 inches (2.54 mm) between two sheets of Circuit Foil 1 ounce per square foot (oz/ft$^2$) (308 g/m$^2$) HFZ-treated copper foil on polished caul plates. The copper clad panels were laminated in a flatbed press at 1,100 psi (7.6 megapascal) on the laminate with a 90-minute dwell at 700 degrees Fahrenheit (371° C.). One eighth inch (3.18 millimeters) wide strips were etched onto the laminates and were peeled in a TMI Lab Master Release and Adhesion tester at 2 inches per minute (5.08 cm/min) using the 90° angle setting. The average peel strengths ranged from 3 to 6.1 pounds per linear inch (pli) (1.36 to 2.77 kilograms per 2.54 cm).

Set forth below are various non-limiting aspects of the present disclosure.

Aspect 1: A hexaferrite composite, comprising: polytetrafluoroethylene; and greater than or equal to 40 vol %, or 40 to 90 vol % a plurality of $Co_2Z$ hexaferrite particles based on the total volume of the polytetrafluoroethylene and the plurality of $Co_2Z$ hexaferrite particles on a void-free basis; wherein the hexaferrite composite has a porosity of greater than or equal to 10 vol % based on the total volume of the hexaferrite composite; wherein the hexaferrite composite has a permeability of greater than or equal to 2.5 and a ratio of the permeability to the permittivity of greater than or equal to 0.4, both determined at 500 MHz. The permeability and the permittivity can be measured using a 1 inch (25 mm) coaxial airline with a Nicolson-Ross extraction from the scattering parameters measured using a vector network analyzer. The permeability and the permittivity can be measured in accordance with the NIST Technical Note 1536 entitled Measuring the Permittivity and Permeability of Lossy Materials: Solids, Liquids, Metals, Building Materials, and Negative-Index Materials, dated February 2005.

Aspect 2: The hexaferrite composite of Aspect 1, wherein the plurality of $Co_2Z$ hexaferrite particles has a median particle size of greater than or equal to 4 micrometers, or 6 to 100 micrometers, or 12 to 100 micrometers, or 24 to 50 micrometers. The particle size can be as measured by the Horiba LA-910 laser light scattering particle size distribution analyzer.

Aspect 3: The hexaferrite composite of any one or more of the preceding aspects, wherein the hexaferrite composite comprises 60 to 90 vol % of the plurality of $Co_2Z$ hexaferrite particles.

Aspect 4: The hexaferrite composite of any one or more of the preceding aspects, wherein the plurality of $Co_2Z$ hexaferrite particles comprise a surface treatment comprising at least one of an aromatic silane or a fluorinated aliphatic alkoxy silane.

Aspect 5: The hexaferrite composite of any one or more of the preceding aspects, wherein the plurality of $Co_2Z$ hexaferrite particles comprises at least one of Al, Ba, Bi, Ni, Ir, Mn, Mg, Mo, Nb, Nd, Sr, V, Zn, or Zr.

Aspect 6: The hexaferrite composite of any one or more of the preceding aspects, wherein hexaferrite composite comprises 5 to 60 vol %, or 5 to 50 vol %, or 10 to 40 vol % of the PTFE based on the total volume of the PTFE and the plurality of $Co_2Z$ hexaferrite particles on a void-free basis.

Aspect 7: The hexaferrite composite of any one or more of the preceding aspects, wherein the hexaferrite composite has a porosity of 15 to 50 vol %, or 20 to 45 vol % based on the total volume of the hexaferrite composite.

Aspect 8: The hexaferrite composite of any one or more of the preceding aspects, wherein the hexaferrite composite has at least one of: a permeability of 4.5 to 7, or 6 to 7 at 500 MHz; a permittivity of greater than or equal to 4, or 5 to 8, or 6 to 7 at 500 MHz; a ratio of the permeability to the permittivity of 0.5 to 0.98, or 0.7 to 0.98 at 500 MHz; a magnetic loss tangent of less than or equal to 0.1, or less than or equal to 0.08, or 0.01 to 0.07, or 0.01 to 0.05 at 500 MHz; or a dielectric loss of less than or equal to 0.1, or less than or equal to 0.05, or 0.001 to 0.05, or 0.01 to 0.05 at 500 MHz.

Aspect 9: The hexaferrite composite of any one or more of the preceding aspects, wherein the hexaferrite composite has a copper bond strength of 3 to 7 pli, or 4 to 6 pli, as measured in accordance with IPC test method 650, 2.4.9.

Aspect 10: The hexaferrite composite of any one or more of the preceding aspects, further comprising at least one of a dielectric filler or a fibrous layer.

Aspect 11: An article comprising the hexaferrite composite of any one or more of the preceding aspects.

Aspect 12: The article of Aspect 11, further comprising a conductive layer located on at least one of the surfaces of the hexaferrite composite.

Aspect 13: The article of Aspect 11 or Aspect 12, wherein the article is an antenna.

Aspect 14: A method of making a sheet comprising the hexaferrite composite of any one or more of the preceding aspects can comprise: paste extruding, casting, or molding a mixture comprising the PTFE and the plurality of $Co_2Z$ hexaferrite particles to form the sheet.

Aspect 15: The method of Aspect 14, wherein the forming comprises the paste extruding, and wherein the method further comprises calendering the sheet.

Aspect 16: The method of any one or more of Aspects 14 to 15, wherein the mixture comprising the PTFE in the form of a dispersion or a powder, the plurality of $Co_2Z$ hexaferrite particles, and a lubricant.

Aspect 17: The method of any one or more of Aspects 14 to 17, wherein the forming comprises the casting, wherein the mixture is an aqueous dispersion comprising the PTFE and the plurality of $Co_2Z$ hexaferrite particles; and wherein the method further comprises heating the sheet after casting to a first temperature and sintering the sheet at a second temperature.

Aspect 18: The method of Aspect 17, wherein the casting comprises casting the mixture onto a cloth reinforcement, preferably a glass cloth reinforcement.

Aspect 19: The method of any one or more of Aspects 14 to 18, wherein the forming comprises mixing the PTFE in granular form and the plurality of $Co_2Z$ hexaferrite particles to form the mixture; and dry calendering or molding the mixture to form the sheet.

Aspect 20: The method of any one of Aspects 14 to 19, further comprising mixing the PTFE, the plurality of $Co_2Z$ hexaferrite particles, and a lubricant prior to forming the sheet.

Aspect 21: The method of Aspect 20, wherein the mixing comprises at least one of air milling, assisted mixing, tumble mixing, or mixing for 4 to 100 minutes.

Aspect 22: The method of any one or more of Aspects 14 to 21, wherein, if the sheet is calendered, the calendering comprises calendering two or more times.

Aspect 23: The method of any one or more of Aspects 14 to 22, further comprising soaking the hexaferrite composite in water and heating at a temperature of 150 to 300° C., or 50 to 300° C., or 200 to 300° C. for 1 to 40 hours, or 5 to 15 hours.

Aspect 24: The method of any one or more of Aspects 14 to 23, further comprising adding a conductive layer on at least one surface of the hexaferrite composite.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

The term "cut-off frequency" is the frequency at which the imaginary component of permeability reaches its maximum. The term "magneto-crystalline anisotropy field" is a measure of the difference in magnetizing force required to induce a given magnetization in one axis versus another axis (typically basal plane and c-axis). The term "magnetic saturation" is the applied magnetic field, which magnetization does not increase for an increased applied field. It should be noted that the term saturation magnetization can be used in three different contexts. The "volume magnetization" is expressed in emu/cm$^3$, where $4\pi M_S$ has the units of Gauss. The "mass magnetization" is expressed in emu/g. When comparing the relative properties of two materials, it should be understood that the units are the same.

The term "relative permeability" is the degree of magnetization seen in a material in response to a magnetic field, divided by the degree of magnetization seen in a vacuum when the same magnetic field is applied. The term "relative permittivity" is the flux density in response to an applied electric field, divided by the flux density in response to an applied electric field for a vacuum. The term "magnetic loss tangent" is the ratio of imaginary permeability to real relative permeability at a given frequency, u"/u'. The term "dielectric loss tangent" is the ratio of imaginary permittivity to real relative permittivity, e"/e'. While for magnetic materials, it is necessary to specify the frequency of measurement, dielectric materials typically exhibit stable dielectric loss over a wide frequency range, so this specification can be omitted while describing dielectric loss.

The term "intrinsic impedance" is the ratio of electric field to magnetic flux density for a transverse-electric-magnetic wave propagating through a medium. The intrinsic impedance of a medium can be calculated from the square root of the ratio between its absolute permeability and absolute permittivity. The term "high impedance magneto-dielectric" is a material comprising a polymer matrix and a filler material with a permeability greater than one, where the composite material exhibits a permeability greater than one, permittivity greater than one, and an intrinsic impedance of greater than 350 Ohm, at the upper operating frequency. The term "loss high impedance magneto-dielectric" is a material comprising a polymer matrix and a filler material with a permeability greater than one, where the composite material exhibits a permeability greater than one, permittivity greater than one, and an intrinsic impedance of greater than 350 Ohm, at the upper operating frequency, where the upper operating frequency is defined as the first frequency at which the magnetic loss tangent exceeds 0.07.

The terms "a" and "an" do not denote a limitation of quantity, but rather denote the presence of at least one of the referenced items. The term "or" means "and/or" unless clearly indicated otherwise by context. Reference throughout the specification to "an embodiment", "another embodiment", "some embodiments", "an aspect" and so forth, means that a particular element (e.g., feature, structure, step, or characteristic) described in connection with the embodiment is included in at least one embodiment described herein, and may or may not be present in other embodiments. In addition, it is to be understood that the described elements may be combined in any suitable manner in the various embodiments.

In general, the compositions, methods, and articles can alternatively comprise, consist of, or consist essentially of, any ingredients, steps, or components herein disclosed. The compositions, methods, and articles can additionally, or alternatively, be formulated, conducted, or manufactured so as to be devoid, or substantially free, of any ingredients, steps, or components not necessary to the achievement of the function or objectives of the present claims. "Optional" or "optionally" means that the subsequently described event or circumstance may or may not occur, and that the description includes instances where the event occurs and instances where it does not.

Unless specified to the contrary herein, all test standards are the most recent standard in effect as of the filing date of this application, or, if priority is claimed, the filing date of the earliest priority application in which the test standard appears.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %", such as 10 to 23 wt %, etc. When an element such as a layer, film, region, or substrate is referred to as being "on" another element, it can be directly on the other element or intervening elements may also be present. In contrast, when an element is referred to as being "in direct physical contact" another element, there are no intervening elements present. A list comprising "at least one of" means that the list is inclusive of each element individually, as well as combinations of two or more elements of the list, and combinations of at least one element of the list with like elements not named. The term "combination" is inclusive of blends, mixtures, alloys, reaction products, and the like. Unless defined otherwise, technical and scientific terms used herein have the same meaning as is commonly understood by one of skill in the art to which this invention belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference. While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A hexaferrite composite, comprising:
   polytetrafluoroethylene; and
   greater than or equal to 40 vol % of a plurality of $Co_2Z$ hexaferrite particles based on the total volume of the polytetrafluoroethylene and the plurality of $Co_2Z$ hexaferrite particles on a void-free basis;
   wherein the hexaferrite composite has a porosity of greater than or equal to 10 vol % based on the total volume of the hexaferrite composite;
   wherein the hexaferrite composite has a permeability of greater than or equal to 2.5 and a ratio of the permeability to a permittivity of greater than or equal to 0.4, both determined at 500 MHz; and
   wherein the permeability and the permittivity are measured in a 1-inch coaxial airline with a Nicolson-Ross extraction from the scattering parameters measured using a vector network analyzer.

2. The hexaferrite composite of claim 1, wherein the plurality of $Co_2Z$ hexaferrite particles has a median particle size of greater than or equal to 4 micrometers; wherein the median particle is determined in accordance with ASTM D4464-15.

3. The hexaferrite composite of claim 1, wherein the hexaferrite composite comprises greater than 60 to 90 vol % of the plurality of $Co_2Z$ hexaferrite particles.

4. The hexaferrite composite of claim 1, wherein the plurality of $Co_2Z$ hexaferrite particles comprise a surface treatment comprising at least one of an aromatic silane or a fluorinated aliphatic alkoxy silane.

5. The hexaferrite composite of claim 1, wherein the plurality of $Co_2Z$ hexaferrite particles comprises at least one of Al, Ba, Bi, Ni, Ir, Mn, Mg, Mo, Nb, Nd, Sr, V, Zn, or Zr.

6. The hexaferrite composite of claim 1, wherein hexaferrite composite comprises 5 to 60 vol % of the polytetrafluoroethylene based on the total volume of the polytetrafluoroethylene and the plurality of $Co_2Z$ hexaferrite particles on a void-free basis.

7. The hexaferrite composite of claim 1, wherein the porosity is 15 to 50 vol % based on the total volume of the hexaferrite composite.

8. The hexaferrite composite of claim 1, wherein at least one of:
the permeability is 4.5 to 7 at 500 MHz;
the ratio of the permeability to the permittivity is 0.5 to 0.98 at 500 MHz;
the hexaferrite composite has a permittivity of greater than or equal to 4 at 500 MHz;
the hexaferrite composite has a magnetic loss tangent of less than or equal to 0.1 at 500 MHz; or
the hexaferrite composite has a dielectric loss of less than or equal to 0.1 at 500 MHz.

9. The hexaferrite composite of claim 1, wherein the hexaferrite composite has a copper bond strength of 3 to 7 pli as measured in accordance with IPC test method 650, 2.4.9.

10. The hexaferrite composite of claim 1, further comprising at least one of a dielectric filler or a fibrous layer.

11. An article comprising the hexaferrite composite of claim 1.

12. The article of claim 11, wherein the article is an antenna.

13. A hexaferrite composite, comprising:
5 to 60 vol % of polytetrafluoroethylene; and
40 to 95 vol % of a plurality of $Co_2Z$ hexaferrite particles having a median particle size of greater than or equal to 4 micrometers as determined in accordance with ASTM D4464-15;
wherein the volume percents of the polytetrafluoroethylene and the plurality of $Co_2Z$ hexaferrite particles are based on the total volume of the polytetrafluoroethylene and the plurality of $Co_2Z$ hexaferrite particles on a void-free basis;
wherein the hexaferrite composite has a porosity of 15 to 50 vol % based on the total volume of the hexaferrite composite;
wherein the hexaferrite composite has a permeability of greater than or equal to 2.5 and a ratio of the permeability to the a permittivity of greater than or equal to 0.4, both determined at 500 MHz; and
wherein the permeability and the permittivity are measured in a 1-inch coaxial airline with a Nicolson-Ross extraction from the scattering parameters measured using a vector network analyzer.

14. A method of forming a sheet comprising a hexaferrite composite comprising:
at least one of paste extruding, casting, or molding a mixture comprising polytetrafluoroethylene and a plurality of $Co_2Z$ hexaferrite particles to form the sheet;
wherein the sheet comprises greater than or equal to 40 vol % of the plurality of $Co_2Z$ hexaferrite particles based on the total volume of the polytetrafluoroethylene and the plurality of $Co_2Z$ hexaferrite particles on a void-free basis;
wherein the hexaferrite composite has a porosity of greater than or equal to 10 vol % based on the total volume of the hexaferrite composite;
wherein the hexaferrite composite has a permeability of greater than or equal to 2.5 and a ratio of the permeability to a permittivity of greater than or equal to 0.4, both determined at 500 MHz; and
wherein the permeability and the permittivity are measured in a 1-inch coaxial airline with a Nicolson-Ross extraction from the scattering parameters measured using a vector network analyzer.

15. The method of claim 14, wherein the forming comprises the paste extruding, and wherein the method further comprises calendering the sheet.

16. The method of claim 15, wherein the mixture comprises the polytetrafluoroethylene in the form of a dispersion or a powder, the plurality of $Co_2Z$ hexaferrite particles, and a lubricant.

17. The method of claim 14, wherein the forming comprises the casting, wherein the mixture is an aqueous dispersion comprising the polytetrafluoroethylene and the plurality of $Co_2Z$ hexaferrite particles; and wherein the method further comprises heating the sheet after casting to a first temperature and sintering the sheet at a second temperature.

18. The method of claim 17, wherein the casting comprises casting the mixture onto a cloth reinforcement, preferably a glass cloth reinforcement.

19. The method of claim 14, wherein the forming comprises mixing the polytetrafluoroethylene in granular form and the plurality of $Co_2Z$ hexaferrite particles to form the mixture; and at least one of dry calendering or molding the mixture to form the sheet.

20. The method of claim 14, further comprising adding a conductive layer on at least one surface of the sheet.

* * * * *